M. E. PIPKIN.
BATTERY.
APPLICATION FILED MAY 15, 1918.
1,363,671. Patented Dec. 28, 1920.
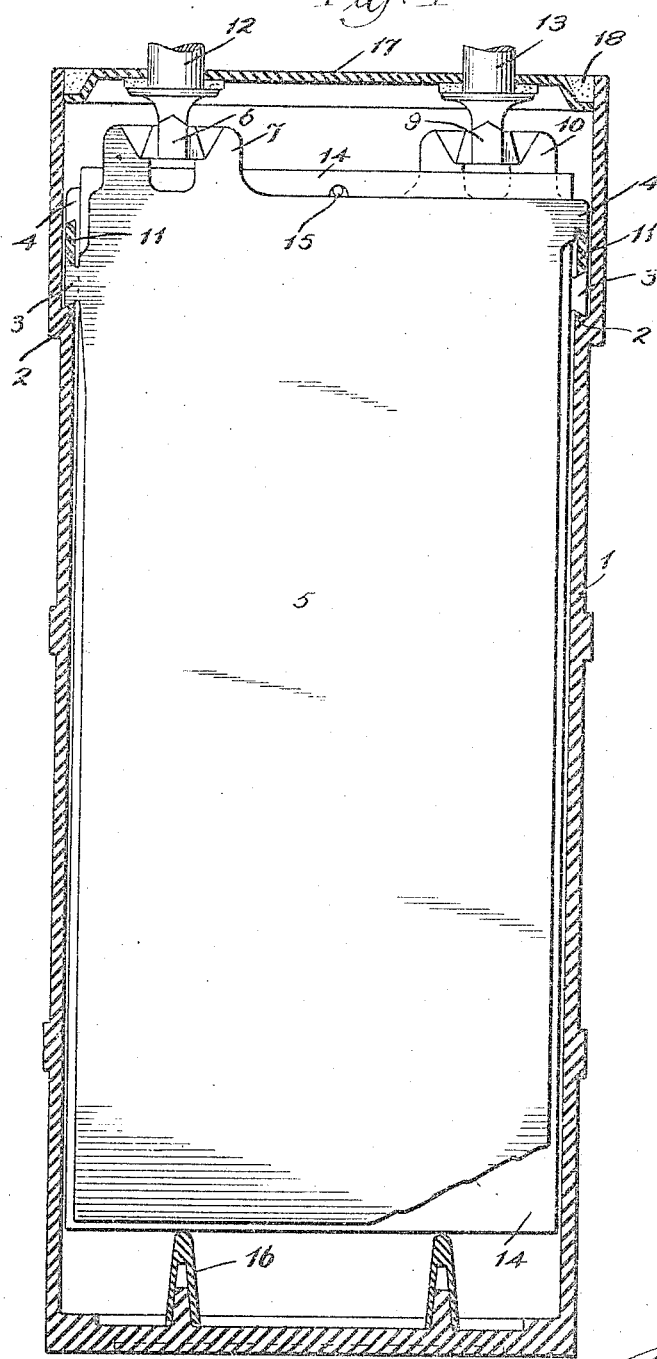
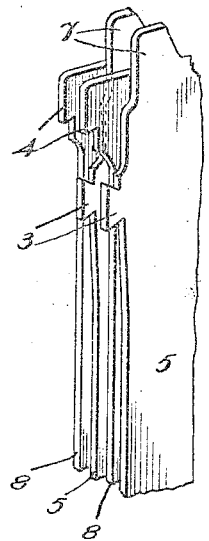
INVENTOR
Marcus E Pipkin
BY
John L. Cowling
ATTORNEY

UNITED STATES PATENT OFFICE.

MAURICE E. PIPKIN, OF NACOGDOCHES, TEXAS, ASSIGNOR TO GOULD STORAGE BATTERY COMPANY, A CORPORATION OF NEW YORK.

BATTERY.

1,363,671.

Specification of Letters Patent.  Patented Dec. 28, 1920.

Application filed May 15, 1918. Serial No. 234,620.

*To all whom it may concern:*

Be it known that I, MAURICE E. PIPKIN, a citizen of the United States, and resident of Nacogdoches, county of Nacogdoches, and State of Texas, have invented new and useful Improvements in Batteries, set forth in the annexed specification and drawing forming a part thereof.

My invention pertains to batteries such as employ a plurality of plates or electrodes immersed in an electrolyte in close proximity to each other, and has for a particular object to provide means whereby such plates or electrodes will be supported in the proper relationship to each other and effectively insulated from each other in a desired manner.

As my invention is particularly applicable to batteries employing plates of large dimensions, such as used in submarine vessels where it is necessary to economize space as much as possible, it will be described with reference to a battery of this type wherein the length of the plates is considerably in excess of the width thereof. And as the receptacles of such batteries are as small as possible within the limits of the amount of electrolyte required, it is necessary that the plates shall be held at all times in very close approximation to their true and proper positions and not subject to shifting as the jar is canted or vibrated, in the manner incident to such use.

A further object of my invention is to provide a structure wherein large and heavy plates may be assembled and held in their correct positions with respect to each other, in such manner that they may then be easily and as a unit placed into a receptacle affording small clearance, and, when necessary, withdrawn therefrom as a unit with as little inconvenience as possible.

Figure 1 is a section of a jar or receptacle and elevation of the plates or electrodes of a battery of this type comprehending my invention.

Fig. 2 is a perspective showing the arrangement of portions of the plates of the battery of Fig. 1.

In the drawing, 1 represents any suitable type of jar or receptacle for containing the battery elements and electrolyte and preferably provided at its upper end with an expanded portion in the direction of the width of the plates, which portion is provided with beveled ledges 2 for supporting the plates. The positive and negative plates are preferably all substantially of the same external configuration and are preferably provided on one side with a beveled ear or lug 3 adapted to rest upon the beveled portion 2 of the jar or receptacle. The opposite side of each plate is preferably provided with a lug or ear 4, beveled on its lower side in substantially the same manner as the lower side of the ear or lug 3 but positioned nearer the top of the plate so that when a number of negative plates 5 are united to a bus-bar 6, as by burning the same to the usual connecting lugs 7, and a suitable number of positive plates 8 are united with the bus-bar 9, as by burning the lugs 10 thereto, and the positions of the plates with respect to each other reversed, they may then be nested with a positive between each pair of negatives, in the usual manner, and separated therefrom as by usual separators 14. And the lugs 3 of the plates of one polarity will all be on one side of the assemblage, while the lugs 3 of the opposite polarity will all be on the opposite side, which relationship will also be true of the lugs 4. And I insert between the lugs 4 of the plates of one polarity, and the upper side of the lugs 3 of the plates of the opposite polarity, beveled insulating strips or members 11, which in effect dove-tail the plates together. Then, if the total assemblage of plates be lifted by means of the connectors 12 united to the bus-bar 6 and the connectors 13 united to the bus-bar 9, gravity will tend to cause the plates united to the bar 6 to swing in a clockwise direction and those united to the bar 9 in a counter-clockwise direction, with the effect that the lugs 4 of the plates united to the bus-bar 6 will crowd the member 11 engaged thereby downwardly upon the lugs 3 of the set of plates attached to the bus-bar 9; while the lugs 4 of the plates united with the bar 9 will press downwardly upon the member 11 engaged thereby and crowd the same down upon the upper surface of the lugs 3 of the opposite set of plates. And in this manner the plates will all be firmly locked in their proper positions and may be moved from place to place and easily lowered as a unit into a close-fitting receptacle, as desired. The usual separators indicated at 14 are placed between the plates, as is customary, and they may be held in place while the plates are being moved as above outlined, by means of perforations in the tops of the separators engaged by an insulating rod 15; and, when the battery is in place in its jar or receptacle, they may be supported by any of the usual ribs extending upwardly from the bottom of the jar, as shown at 16, if desired. When the plates are lowered into the jar or receptacle and the lugs 3 rest upon the beveled portion 2, the plates will all be held firmly locked together by their own weight and will be held in proper position within the jar by engagement of the beveled portions 2, and the weight of the plates will not tend to bulge or otherwise distort the jar, even under the action of continued vibration. And, as the jar is rocked or canted, the great weight of the plates upon the beveled faces of the various supports will prevent the plates from shifting or working in the receptacles.

Any suitable type of cover, as indicated at 17, may be employed, and the same is merely indicated in a conventional form here as it forms no particular part of my present invention, which has for one of its important objects to hold the plates in such rigid relationship with respect to the jar that such cover may safely be made gas-tight with respect to the lugs 12 and 13, and also rigidly cemented, as indicated at 18, to the jar without danger of undue strains caused by shifting of the plates.

I do not wish in any way to limit myself to any of the exact details of construction nor modes of operation above described for the purpose of illustrating an embodiment of my invention, for it will be obvious that many departures may be made without departing from the spirit and scope of my invention, which is as set forth in the following claims.

1. A battery comprehending a plurality of plates provided with engaging means, an insulating member engaged thereby and supported by the plate serving to retain the same in proper relative positions, and means for supporting the plates by engagement with the above mentioned engaging means.

2. A battery comprehending a plurality of plates each provided with engaging means, an insulating member engaged thereby and supported by certain plates and supporting other of the plates by engagement with the respective engaging means thereof, combined with means for supporting all of the plates by engagement with certain of the aforesaid engaging means.

3. The combination with a plurality of plates of different polarity, each provided with similar engaging means, insulating means carried by the engaging means of one polarity and supporting the engaging means of another polarity, and means engaging certain of the engaging means and supporting the plates.

4. The combination with a plurality of positive plates and a plurality of negative plates each provided with engaging means, of insulating means carried by the engaging means of each polarity and supporting the engaging means of the opposite polarity, and means for supporting the thus engaged plates from points below the above mentioned engagement.

5. The combination with a plurality of plates of different polarity, each provided with engaging means, insulating means carried by the engaging means of one polarity and supporting engaging means of another polarity combined with supporting means engaged by certain of the aforesaid engaging means.

6. The combination with a plurality of positive plates and a plurality of negative plates each provided with engaging means and insulating means carried by the engaging means of each polarity and supporting an engaging means of the opposite polarity, of a receptacle containing said plates comprehending means for supporting the same by engagement with the engaging means thereof.

7. The combination with a plurality of plates provided with interlocking means comprehending an insulating member on each side of the plates engaged by portions thereof, a receptacle for the plates, and means for supporting the interlocked plates by the engagement with certain plates at one side of the receptacle and other plates at the opposite side of the receptacle.

MAURICE E. PIPKIN.